United States Patent [19]
Gavette

[11] Patent Number: 5,628,154
[45] Date of Patent: May 13, 1997

[54] MODULAR CONSTRUCTION FOR A GEODESIC DOME

[76] Inventor: James A. Gavette, 104 2nd Ave., Santa Cruz, Calif. 95062

[21] Appl. No.: 514,158

[22] Filed: Aug. 11, 1995

[51] Int. Cl.$^6$ ..................................................... E04B 1/32
[52] U.S. Cl. .......................... 52/81.4; 52/81.1; 52/588.1; 52/589.1; 403/326; 403/375; 403/381
[58] Field of Search .................... 52/81.1, 81.4, 52/81.5, 82, DIG. 10, 588.1, 589.1, 591.1, 591.4, 591.5, 592.1, 80.1, 80.2, 81.2, 81.3; 403/375, 381, 345, 326

[56] References Cited

U.S. PATENT DOCUMENTS

| | | | |
|---|---|---|---|
| 2,918,151 | 12/1959 | Kennedy | 52/81.1 X |
| 2,978,074 | 4/1961 | Schmidt | 52/81.2 |
| 3,043,054 | 7/1962 | Schmidt | 52/81.1 |
| 3,562,976 | 2/1971 | Wollin et al. | 52/82 X |
| 3,676,969 | 7/1972 | Moore | 403/345 X |
| 3,685,221 | 8/1972 | Mangan | 52/80.1 |
| 3,694,983 | 10/1972 | Couquet | 52/591.5 X |
| 3,722,153 | 3/1973 | Baer | 52/81.2 |
| 3,763,608 | 10/1973 | Chamlee | 52/81.4 |
| 3,810,336 | 5/1974 | Sadso | 52/81.2 |
| 3,871,143 | 3/1975 | Quick | 52/82 X |
| 3,959,830 | 6/1976 | Van Den Broek | 52/592.1 X |
| 3,969,866 | 7/1976 | Kyne | 52/588.1 |
| 4,023,317 | 5/1977 | Bettger et al. | 52/81.4 |
| 4,068,421 | 1/1978 | Marovich | 52/81.4 |
| 4,149,346 | 4/1979 | Belt | 52/81.2 |
| 4,180,950 | 1/1980 | Foster | 52/81.4 |
| 4,241,550 | 12/1980 | Sumner | 52/81.4 |
| 4,309,852 | 1/1982 | Stolpin | 52/DIG. 10 |
| 4,655,013 | 4/1987 | Ritland | 52/81.4 |
| 4,784,172 | 11/1988 | Yacoboni | 52/81.1 X |
| 5,341,610 | 8/1994 | Moss | 52/82 |
| 5,379,557 | 1/1995 | Kotter | 52/81.1 |

FOREIGN PATENT DOCUMENTS

| | | | |
|---|---|---|---|
| 47776 | 4/1977 | Australia | 52/81.1 |
| 774802 | 1/1968 | Canada | 52/81.1 |
| 1577347 | 8/1969 | France | 52/588.1 |
| 2337796 | 8/1977 | France | 52/81.1 |

OTHER PUBLICATIONS

"Cosmo Hut" Brochure, Cosmo Manufacturing Co. (52/81.1) 1965.
Grip Robert, "Tensegrity: Introductory Theory and Model Construction" 1978.
Wenninger, Magnus J., Polyhedron Models, pp. 17–19 1971.

*Primary Examiner*—Carl D. Friedman
*Assistant Examiner*—Laura A. Saladino

[57] ABSTRACT

A geodesic dome structure formed from a plurality of panels. The dome is shaped generally as a spherical icosahedron, and will generally be constructed as a spherical dodecahedron. Each of the panels is divided into nine triangular sections by a ribbing structure integral to the panel. The ribbing provides the panels with extra rigidity for support. This eliminates the need for any internal framing in the structure. The sides of the panels include interlocking means to bind the panels together. The interlocking means allow a user to simply snap the panels together to form the structure.

4 Claims, 5 Drawing Sheets

MODULAR CONSTRUCTION FOR A GEODESIC DOME

FIELD OF THE INVENTION

The present invention relates generally to dome structures, and more particularly is a modular construction for a geodesic dome.

BACKGROUND OF THE INVENTION

Conventional buildings are generally very expensive to construct. It is therefore a goal of many structures to provide an inexpensive shelter. One type of construction utilized toward that goal is the geodesic dome. There are many references in the prior art directed to dome structures as a means of reducing manufacturing costs.

One of the devices in the prior art directed to such a shelter is the "FRAMELESS SHELTER..." by Marovich, U.S. Pat. No. 4,068,421. This structure, like many in this field, is constructed of multiple panels connected to each other to form a dome shelter. The panels are formed from a light-transmitting material.

Another similar structure is the "DOME STRUCTURE", by Foster, U.S. Pat. No. 4,180,950. This reference utilizes diamond shaped panels with interlocking means to join the panels together.

One disadvantage of the prior art devices is that a large number of different panels are required to form the structures. The panels must be of a great many sizes and shapes in order to complete the construction of the desired shelter.

A further shortcoming of the prior art devices is that many of them do not include integral means to join the panels together. Some, such as the Marovich device, simply overlap the panels and bolt them together.

Another disadvantage of the prior art devices is that many of them require internal support frameworks to properly support the structure.

These drawbacks of the prior art devices necessarily mean that construction of the shelter is more complicated than is strictly necessary. This leads to increased construction costs, in terms of the excessive time and effort required for assembly as well as the increased material costs, and therefore reduces the desirability of the structure.

OBJECTS, SUMMARY, AND ADVANTAGES OF THE INVENTION

Accordingly, it is an object of the present invention to provide a construction that can be assembled using a minimal number of non-identical panels, i.e. reduce the number of different parts required.

It is a further object of the present invention to provide a means to easily join the panels of the structure together, so that minimal effort is required for assembly.

It is another object of the present invention to provide a design for a structure that will minimize material cost per cubic foot of space in the structure.

In summary, the present invention is a geodesic dome structure. The dome is formed from a plurality of panels. The dome is shaped generally as a spherical icosahedron, and will generally be constructed as a spherical dodecahedron. Specifically, the dome will be shaped as a spherical hexakis icosahedron. Of all regular and semi-regular symmetrical solids, a spherical hexakis icosahedron provides, for a given size of structure when projected onto a sphere, the maximum number of great circles, the maximum number of equal-sized triangles, and the maximum number of triangles. Inasmuch as arches and triangles are critical elements of structural integrity, forming the structure as a spherical hexakis icosahedron maximizes the strength and structural integrity of the structure. In the preferred embodiment, the inventor has chosen to divide the structure into ten panels that are joined by vertical seams, which have a low probability of leakage. The dome could be subdivided in any way desired by the user. The structural integrity of the dome will be maintained only if the division maintains the spherical hexakis parameter, i.e. 120 faces of the total spherical hexakis icosahedron.

Visual subdivision by a viewer determines whether the dome is described in terms of a dodecahedron or a hexakis icosahedron. If the viewer focuses on a pentagon, outlined by the ribs of the dome, as the basic shape of the structure, the dome would be deemed a dodecahedron. If the basic shape is an equilateral triangle, then the dome would be deemed a hexakis icosahedron.

Each of the panels is divided into nine triangular sections by a ribbing structure integral to the panel. The ribbing provides the panels with extra rigidity for support. This eliminates the need for any internal framing in the structure, and therefore reduces material, and hence overall, cost. The sides of the panels include interlocking means to bind the panels together. The interlocking means allow a user to simply snap the panels together to form the structure.

An advantage of the present invention is that it is very simple to construct and inexpensive to manufacture.

Another advantage of the present invention is that the structure of the panels eliminate the need for independent support structures.

A further advantage of the present invention is that the interlocking means allow the structure to be assembled by hand, requiring little or no use of tools.

A still further advantage of the present invention is that the amount of building materials required is kept to a minimum.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
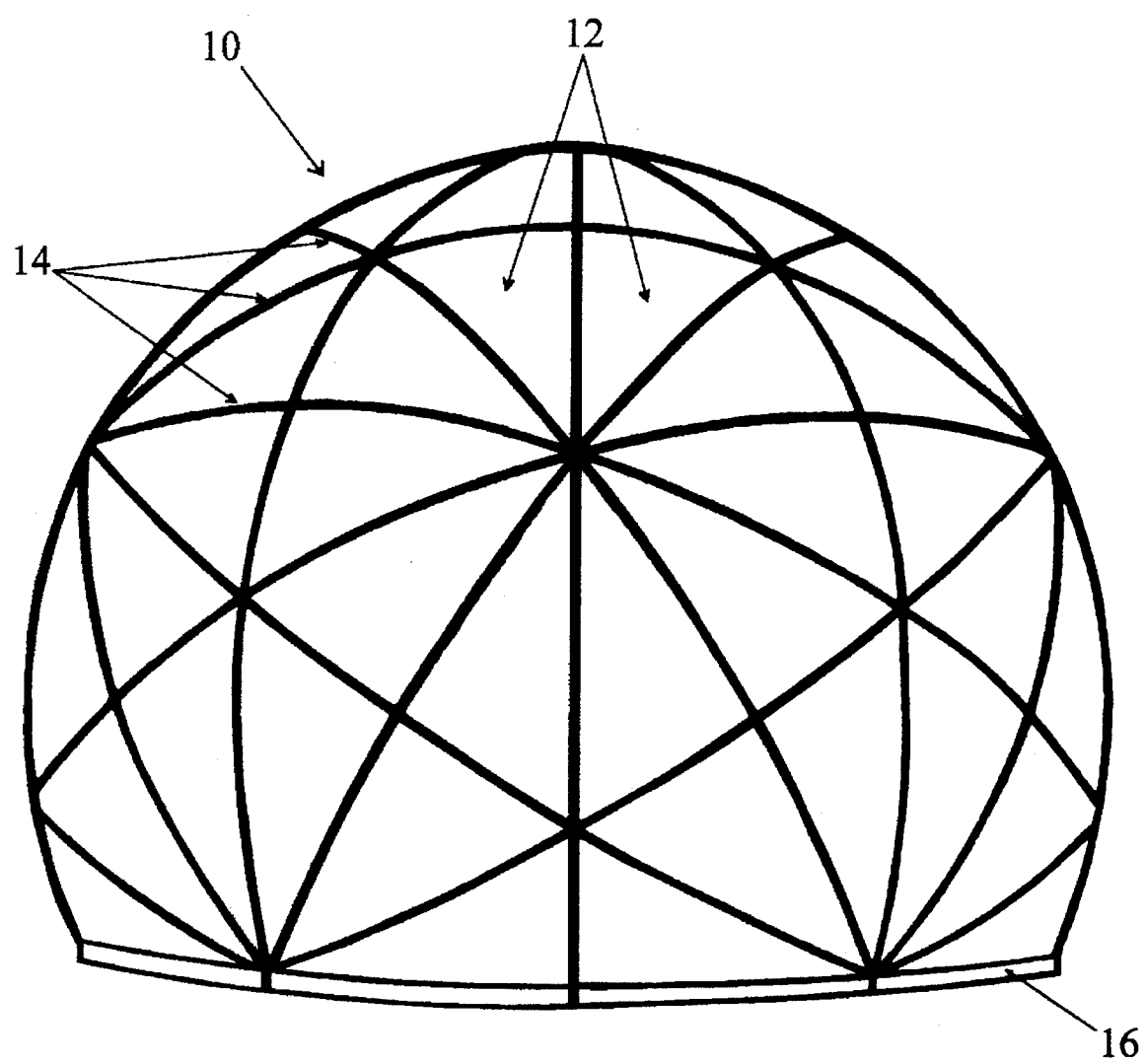
FIG. 1 is a perspective view of a dome constructed according to the present invention.
Figure 2:
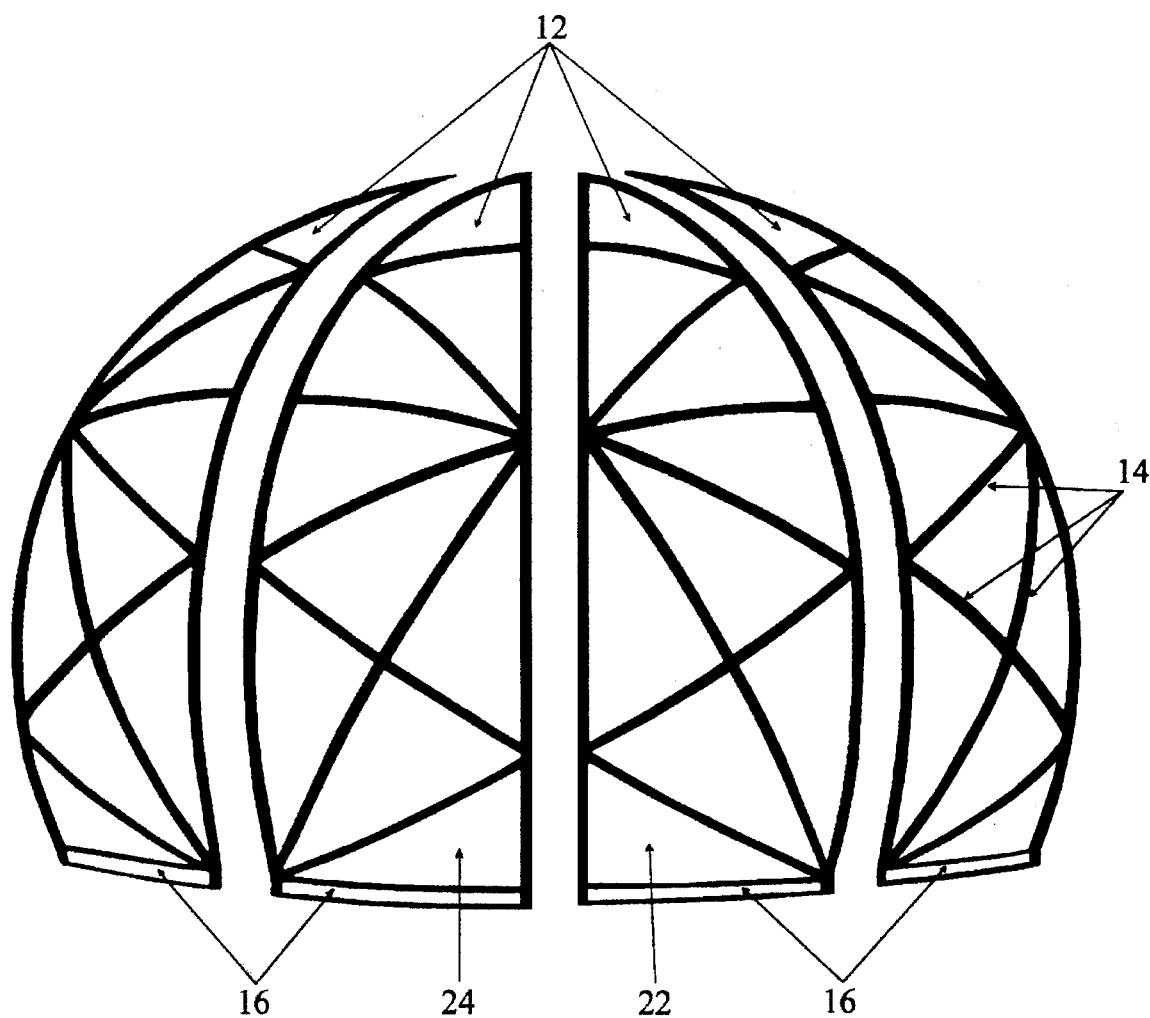
FIG. 2 is a front exploded view of four dome panels.
Figure 3:
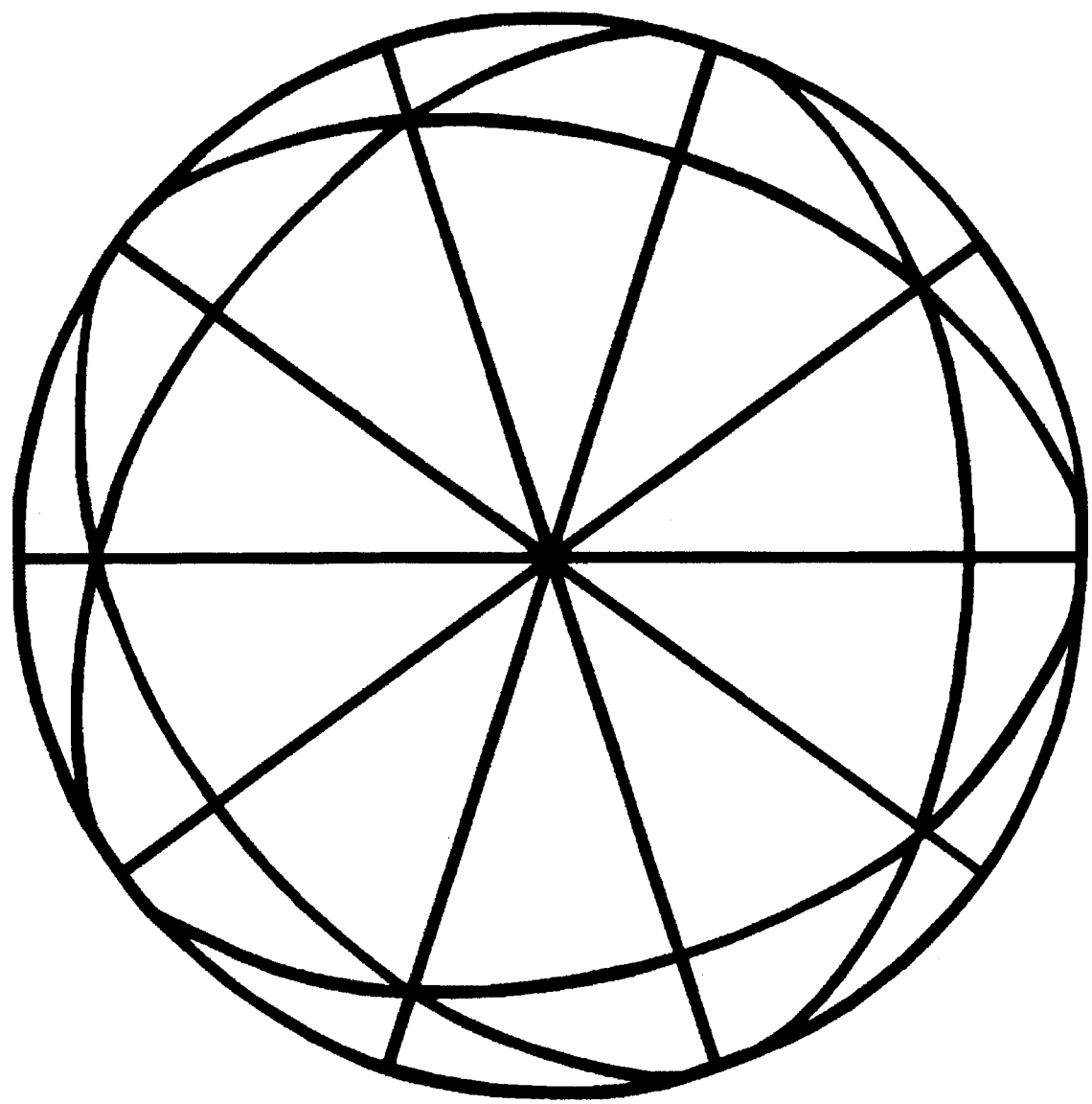
FIG. 3 is a top view of the dome.
Figure 5:
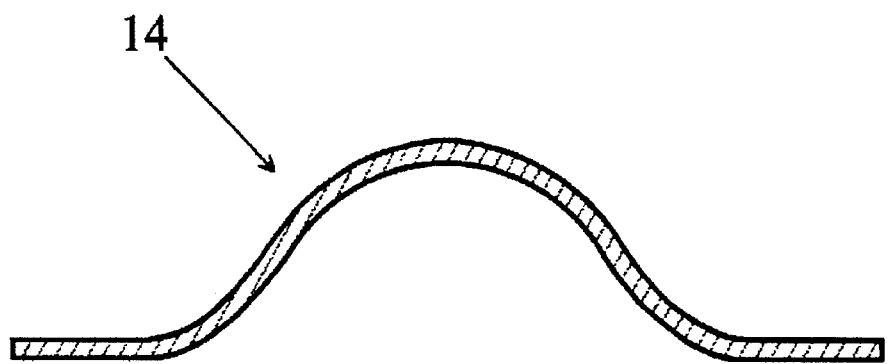
FIG. 5 is a cross section of the ribbing.

Referring chiefly to FIGS. 1 and 2, the present invention is a geodesic dome structure 10. The dome 10 is built from a plurality of panels 12. In order to make the structure self-supporting, a network of ribbing 14 is included in the panels 12. The ribbing 14 is integral to the panels 12. (See FIG. 5.)

Each of the panels 12 is a triangular segment of a sphere. The dome is built such that the resultant structure assumes a shape that is greater than a hemisphere. That is, the dome occupies a space that is approximately 5/8 to 3/4 of a sphere. This allows the user to maximize the storage space created for the material used.

The arch of the panels 12 allows stress from the weight load of the panels 12 to be efficiently transferred to the ground. The shape of the panels 12 also makes it possible to place the ribbing 14 such that each panel 12 is divided into nine triangular sub-segments. After assembly of the panels 12, the ribbing portions in each of the panels 12 is adjacent to corresponding portions in adjoining panels, such that continuous circumference lines are formed by the ribbing 14 around the constructed dome 10. This not only maximizes the strength of the structure, but is very aesthetically pleasing as well.

Figure 6:
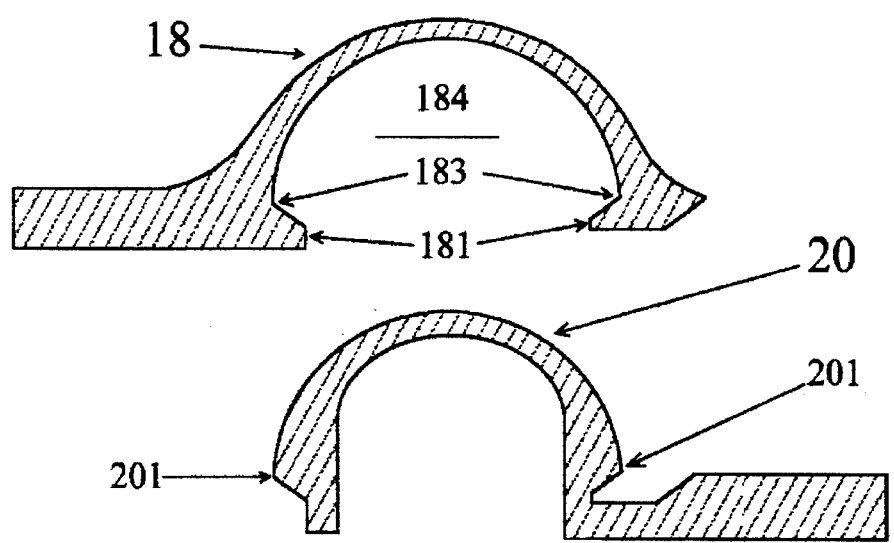
FIG. 6 is a cross section of the interlocking means to join two panels.

Each of the panels 12 includes a base 16 at a lower end. The base 16 is integral to the panels 12, but is enlarged to provide added stability and strength. Each panel 12 also includes either a female interlocking means 18 or a male interlocking means 20 along its sides. The interlocking means 18 and 20 are integrally formed in the panels 12 and extend the length of the sides of the panels 12. The interlocking means are shown in detail in FIG. 6.

The female interlocking means 18 includes two protruding angular projections 181 that extend into an opening to form receiving grooves 183. The female interlocking means 18 is curved to form a receiving aperture 184.

The male interlocking means 20 includes ridges 201 corresponding to the grooves 183 on the female interlocking means. The male interlocking means 20 is curved to conform to the shape of the receiving aperture 184 of the female interlocking means.

A joint between two panels 12 is formed by placing said interlocking means above one another, then pressing said male interlocking means 20 into said female interlocking means 18. The ridges 201 are received in the grooves 183 so that a secure bond is formed by the interlocking means.

The interlocking means 18 and 20 are constructed such that panels can be placed on top of each other without locking together, but a user can push, by hand, the male interlocking means 20 into the female interlocking means 18 so that a joint is formed between two panels. The female interlocking means 18 is sufficiently flexible to receive the male interlocking means 20. Due to the flexible nature of the interlocking means, if a user so desires, the joint can also be taken apart without breaking either of the two adjoining panels.

Only two different panels are required to construct the dome 10, a left hand panel 24 and a right hand panel 22. (See FIG. 2.) In order to easily identify the left and right hand panels, the left hand panel 24 is made with male interlocking means 20 along its sides, and the right hand panel 22 is formed with female interlocking means 18. While this pattern has been chosen in the preferred embodiment, the structure can clearly be accomplished with any pattern of alternating male and female interlocking means.

Assembly of the dome 10 is quickly and easily accomplished, even by an unskilled assembler. The dome 10 is manufactured with an equal number of right 22 and left 24 hand panels. While any number of panels can be utilized depending on the size of the structure chosen, the preferred embodiment uses ten panels 12, five right hand panels 22 and five left hand panels 24.

The assembler simply positions a first panel so that the side with the male interlocking means 16 overlaps the corresponding side of a second panel with a female interlocking means 18. This process continues, alternating left and right hand panels, until the dome is assembled.

No special tools are required for the assembly. Since the interlocking means uses simple ridges integral to the panels, there is no piercing of the external surface of the dome when the panels are assembled as would be the case with nailing or bolting panels together.

Figure 4:
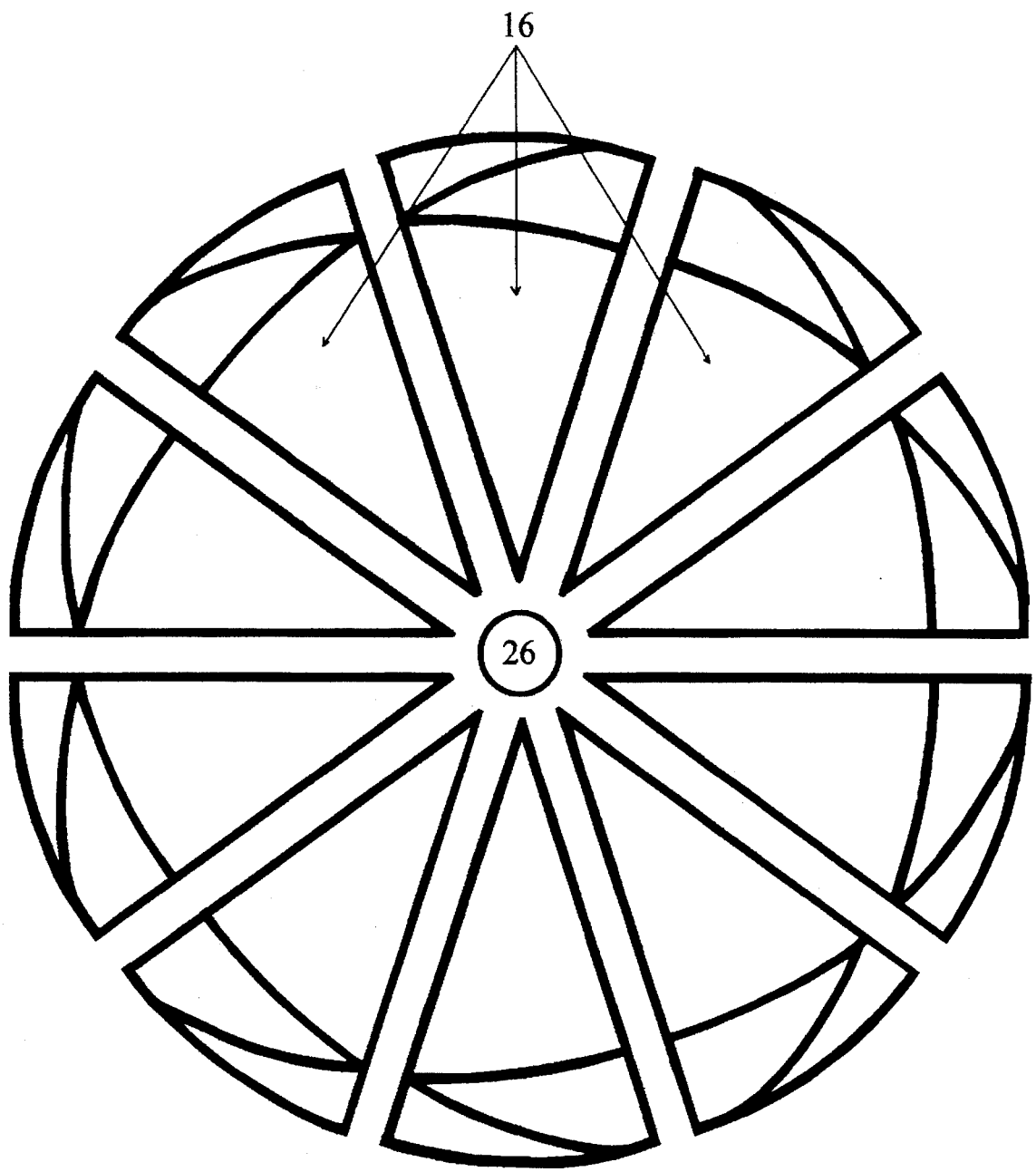
FIG. 4 is a top exploded view of the dome.

A cap plate 26, see FIG. 4, can be added to the top of the structure to ensure that the panels 12 do not pull apart. If the dome is to be used for an application requiring ventilation, the cap plate 26 can include ventilation means. In a vented application, the top ends of the panels 12 would be trimmed to form a vent opening.

It is further envisioned that the preferred embodiment will include a door in at least one of the panels 12. Windows can be added as desired by the user.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A dome structure comprising:

a plurality of panels joined together to form a dome-shaped enclosure, each said panel includes an integral ribbing structure in an interior portion thereof to increase the rigidity of the panel, and interlocking means along its sides, said interlocking means being integral to said panels;

wherein each of said panels includes a female interlocking means that extends the length of a first side of said panel, said female interlocking means is curved to form a receiving aperture, said female interlocking means includes protruding angular projections that extend into an opening of said receiving aperture to form receiving grooves, and each of said panels includes a male interlocking means that extends the length of a second side of said panel, said male interlocking means is curved to conform to the shape of said receiving aperture of said female interlocking means, said male interlocking means includes ridges corresponding to said grooves of said female interlocking means, such that a sealed joint between two of said panels is formed by aligning said first side of a first one of said panels with said second side of a second one of said panels, said male interlocking means being received in said female interlocking means in an interference fit fashion.

2. The dome of claim 1 wherein: horizontal cross section of said dome structure is circular.

3. The dome structure of claim 1 wherein: said dome structure comprises ten said panels.

4. A dome structure comprising:

a plurality of panels joined together to form an enclosure, each said panel includes an integral ribbing structure in an interior portion thereof to increase the rigidity of the panel, and interlocking means along its sides, said interlocking means being integral to said panels; wherein said panels form a spherical hexakis icosahedron, and wherein each of said panels includes a female interlocking means that extends the length of a first side of said panel, said female interlocking means is curved to form a receiving aperture, said female interlocking means includes protruding angular projections that extend into an opening of said receiving aperture to form receiving grooves, and each of said panels includes a male interlocking means that extends the length of a second side of said panel, said male interlocking means is curved to conform to the shape of said receiving aperture of said female interlocking means, said male interlocking means includes ridges corresponding to said grooves of said female interlocking means, such that a sealed joint between two of said panels is formed by aligning said first side of a first one of said panels with said second side of a second one of said panels, said male interlocking means being received in said female interlocking means in an interference fit fashion.

* * * * *